May 5, 1970     W. J. WEBER     3,509,680

PRINTING ON PACKAGES

Filed Dec. 18, 1967     2 Sheets-Sheet 1

INVENTOR.
W. J. WEBER

BY *Young + Quigg*

ATTORNEYS

May 5, 1970   W. J. WEBER   3,509,680
PRINTING ON PACKAGES

Filed Dec. 18, 1967   2 Sheets-Sheet 2

INVENTOR.
W. J. WEBER
BY Young & Quigg
ATTORNEYS

United States Patent Office 3,509,680
Patented May 5, 1970

3,509,680
PRINTING ON PACKAGES
William J. Weber, Fulton, N.Y., assignor to Phillips
Petroleum Company, a corporation of Delaware
Filed Dec. 18, 1967, Ser. No. 691,489
Int. Cl. B65b *61/02, 61/26*
U.S. Cl. 53—14                               6 Claims

ABSTRACT OF THE DISCLOSURE

Packages are formed by sealing two members together. Information is printed on one of the members before sealing, at the region of the seal and on the side of the one member which is sealed to the other. The one member is transparent at the region of the seal so that the printing can be observed through the seal.

This invention relates to printing on packages.

It is often desirable to print certain information on container closures. For example, increasing use is being made in the food and dairy industries of plastic cartons which have films sealed across the top to form the closure. In preparing packages of this type it is common practice to print dates, prices, or other information on the film. In order to reduce inventories of preprinted closure film and to avoid errors resulting from the use of improperly printed film, it is desirable to print the identification data on the film at the time of packaging. Heretofore, this has been a difficult operation because of the tendency of the ink to be smeared during the sealing and subsequent packaging operations.

In accordance with the present invention, an improved method is provided for printing information on packages. This is accomplished by printing the desired information on a transparent section of one element of the packaging and subsequently sealing this element to a second element to form the package. The printing is done at the region of the seal so that the printing is sealed between the container members to provide tamper-proof identification data on the package.

Accordingly, it is an object of this invention to provide an improved method of printing on packages.

Another object is to provide aparatus for printing on package members and subsequently sealing the members to form containers.

A further object is to provide novel printed packages.

Figure 1:
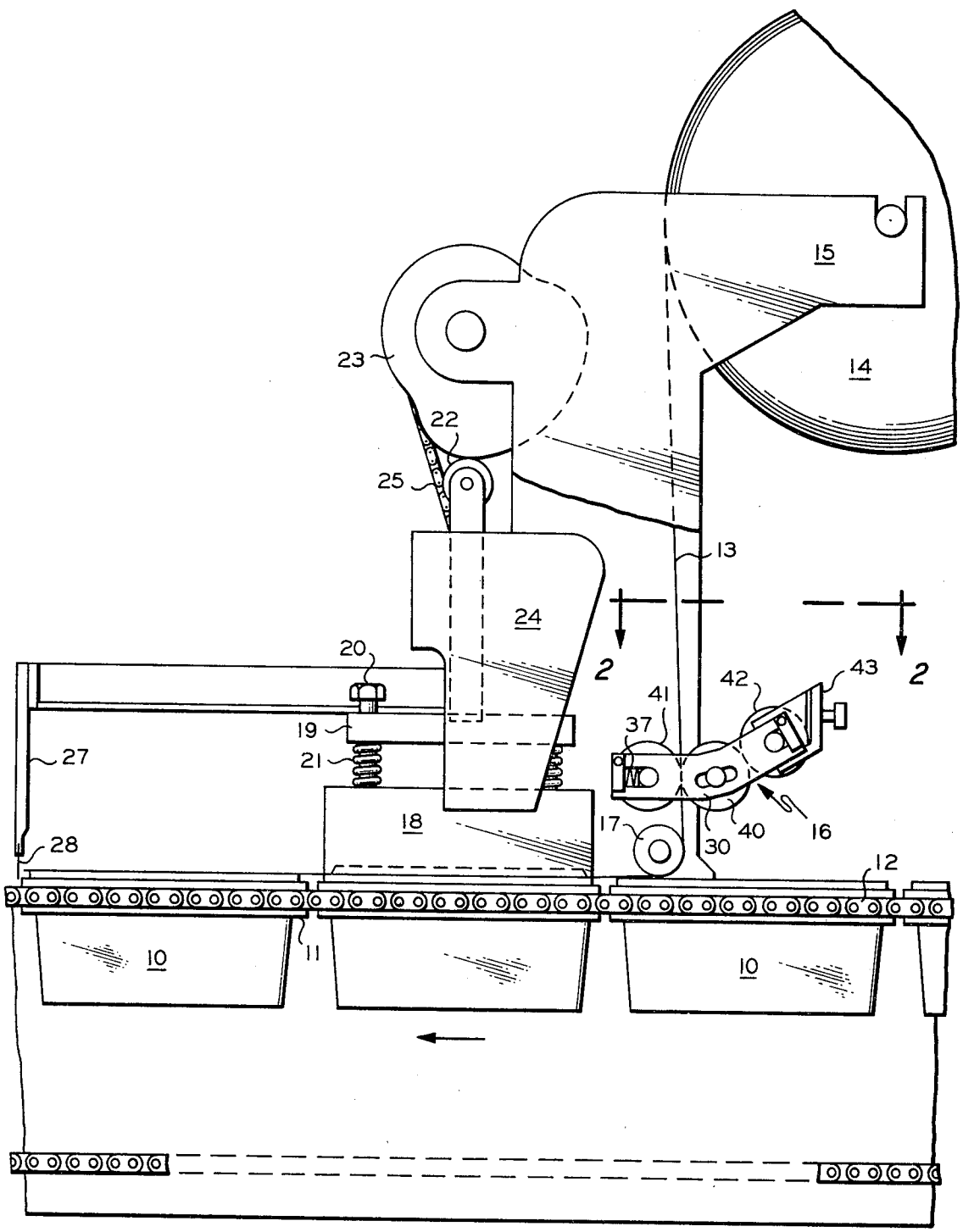
Figure 2:
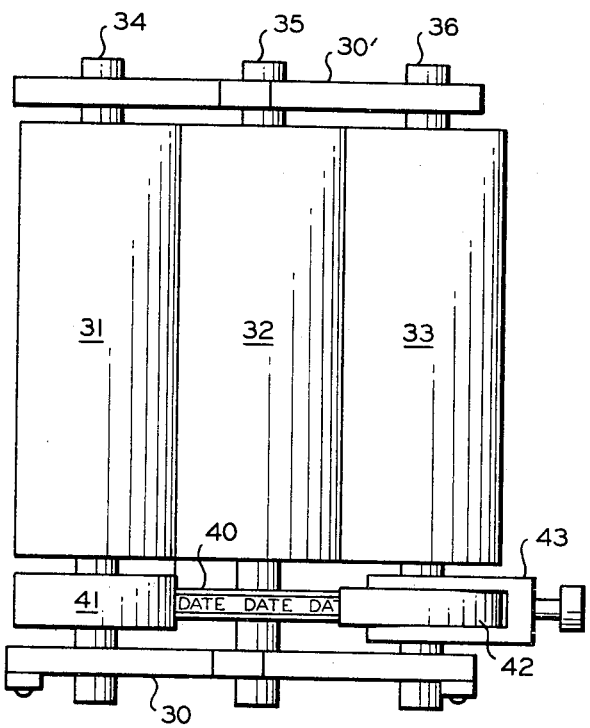
Figure 3:
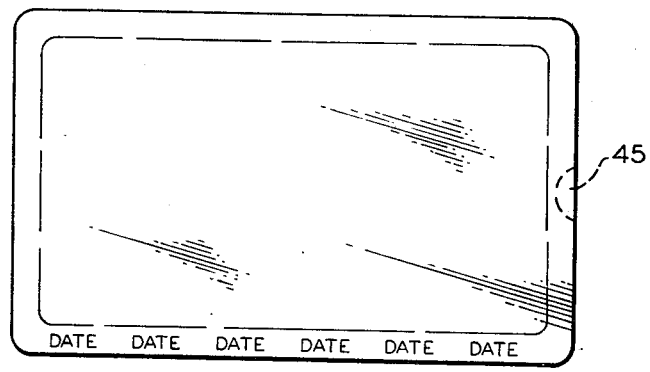

Other objects, advantages and features of the invention should become apparent from the following detailed description taken in conjunction with the accompanying drawing in which:

FIGURE 1 illustrates an embodiment of the printing and sealing mechanism of this invention. FIGURE 2 is a view taken along line 2—2 of FIGURE 1. FIGURE 3 is a top view of a package formed by the apparatus of FIGURE 1.

Referring now to the drawing in detail and to FIGURE 1 in particular, there is shown apparatus which is adapted to seal a closure film to containers 10 which are inserted in pockets 11 that are transported by a conveyor chain 12. These containers and film can advantageously be formed in whole or in part of a thermoplastic material, such as polyethylene for example, to permit heat sealing of the film. As illustrated, containers 10 are moved from right to left. The material to be packaged is inserted into the containers before they arrive at the sealing station illustrated in the drawing. The packages are closed by sealing a strip of film 13 to the flanged upper surface of the containers. This film is supplied from a roll 14 which is supported on a frame 15. Film 13, which is transparent at least on the edge, is fed downwardly through the printing mechanism 16 of this invention and around an idler roll 17 into contact with the containers 10. The edges of film 13 are sealed to the tops of the containers by a heating assembly 18.

Heating assembly 18 is provided with a heating bar which extends around its periphery and which conforms to the shape of the top flange of the containers. Assembly 18 is secured to a plate 19 by screws 20 which have springs 21 mounted thereon. This permits a somewhat flexible connection between plate 19 and the heating bar. A cam follower 22 is secured to plate 19 such that plate 19 and heating assembly 18 are moved downwardly when a cam 23 is rotated. Plate 19 is secured to a frame 24 by means of suitable springs, not shown, which tend to force plate 19 and cam follower 22 upwardly into engagement with cam 23 at all times.

Chain 12 is driven intermittently from a suitable drive mechanism, not shown, such that the containers are advanced sequentially to a position beneath sealing element 18. At this time, cam 23 is rotated by a chain 25 so as to move the heating bar downwardly to seal film 13 to the top of the container. Continued rotation of cam 23 moves the heating assembly upwardly at the completion of the heating cycle. Chain 12 is again actuated to move a second container into the heating position. A film cutting assembly 27, which can include a heated wire 28, is secured to plate 19 so as to be lowered with the heating assembly. This serves to sever the film between adjacent containers. The apparatus thus far described is merely typical of sealing equipment which can be employed in conjunction with the printing apparatus of this invention, and for this reason has not been described in any greater detail.

Printing mechanism 16 is employed to print the desired information on the under side of film 13 immediately before the film is sealed to the containers. The printing takes place at the edge of the film so that the printed information is sealed between the film and the flanged edge of the container. The printing mechanism is supported by two spaced plates 30 and 30' which are secured to frame 15 by suitable connecting members, not shown. Three rollers 31, 32 and 33 are mounted on respective shafts 34, 35 and 36 which extend between plates 30 and 30'. The three shafts are free to revolve with respect to plates 30 and 30'. Springs 37 or other resilient mounting means can be employed to maintain the three rollers in engagement with one another such that rotation of one of the rollers results in corresponding rotation of the other two. Film 13 is fed between rollers 31 and 32 so that roller 31 is rotated in a clockwise direction and roller 32 is rotated in a counterclockwise direction, as viewed in FIGURE 1. Rotation of roller 32 in this manner results in rotation on roller 33 in a clockwise direction.

A printing wheel 40 is mounted on shaft 35 so as to be rotated with roller 32. A backup wheel 41 is mounted on shaft 34 so that the edge of film 13 is printed by date wheel 40 when the film passes through the printing mechanism. An inking roller 42 is mounted on shaft 36 so as to rotate through an ink well 43 and engage printing wheel 40.

The information printed on the under side of the edge of film 13 is sealed between the film and the flange of the container when the film is heat sealed to the container. As illustrated in FIGURE 3, this printed information is visible through transparent film 13. Containers 10 can be provided with notches 45 which permit the film to be removed by the user or, as an alternative, the film can extend over the ends of the containers to provide an extension which can be gripped for subsequent removal.

In view of the foregoing description, it can be seen that an effective means is provided for printing closures immediately before they are sealed to containers. By having the printed matter sealed to the container, there is no danger of the information being smeared or rubbed off, and a tamper proof identification is provided. While this procedure is particularly useful in conjunction with heat sealed packages of the type illustrated, the invention is not so limited. In some applications, the closure can be secured to the container by the use of suitable adhesives which do not smear the printing. As another alternative, the printing can be done on the edge of the container rather than on the film.

While this invention has been described in conjunction with a presently preferred embodiment, it should be evident that it is not limited thereto.

What is claimed is:

1. The method of marking packages which are formed by sealing a closure to a container, which method comprises printing on the closure at a region where the closure is to be sealed to the container, said closure being transparent at said region, and sealing the closure to the container so as to form a package whereby the printing is sealed between the closure and the container at said region.

2. The method of claim 1 wherein the closure is a film and the sealing is accomplished by heating and joining the film and the container to form a heat seal.

3. Packaging apparatus comprising first means to transport a container to a first location, second means to transport a film to said first location, third means at said first location to seal said film to said container to form a package, and printing means positioned to print on said film as it is transported to said first location, said printing means being positioned so as to print on a region and side of said film which is to be sealed to the container so that the printing is sealed between the film and the container.

4. The apparatus of claim 3 wherein said printing means comprises a first roller positioned to be engaged by the film as it is moved to said first location, whereby said first roller is rotated by said film, and a printing roller secured to said first roller so as to engage the edge of the film and print thereon as said film is moved past said printing means.

5. The apparatus of claim 4, further comprising a second roller positioned adjacent the first mentioned roller so that the film moves therebetween to rotate both rollers, a back-up roller secured to said second roller so that the edge of the film being printed moves between said printing roller and said back-up roller, a third roller positioned in contact with the first mentioned roller so as to rotate therewith, and an inking roller secured to said third roller to rotate therewith and ink said printing roller.

6. The apparatus of claim 3 wherein said first means is a conveyor having a plurality of openings therein to carry containers which have open tops, said second means comprises means to move film over the open tops of the containers at said first location, and said third means comprises a heating bar to press the film into engagement with the top edge of the containers to form heat seals.

References Cited

UNITED STATES PATENTS 3,191,849   6/1965   Gutowski et al. _____ 229—55

JAMES B. MARBERT, Primary Examiner

U.S. Cl. X.R.

53—131